United States Patent [19]

Tanaka et al.

[11] Patent Number: 5,624,497
[45] Date of Patent: Apr. 29, 1997

[54] COATING APPARATUS

[75] Inventors: Hideki Tanaka, Saku; Eizo Tsunoda, Komoro; Ryuji Hosogaya; Akira Hatakeyama, both of Saku; Yoshihisa Osawa, Miyota-machi; Seiichi Tobisawa, Hino, all of Japan

[73] Assignees: TDK Corporation; Konica Corporation, both of Tokyo, Japan

[21] Appl. No.: 408,287

[22] Filed: Mar. 22, 1995

[30] Foreign Application Priority Data

Mar. 25, 1994 [JP] Japan ................... 6-077770

[51] Int. Cl.$^6$ ........................................... B05C 3/02
[52] U.S. Cl. ............................ 118/410; 118/411
[58] Field of Search ........................ 118/419, 410, 118/411; 427/356

[56] References Cited

U.S. PATENT DOCUMENTS

| 4,424,762 | 1/1984 | Tanaka et al. | 118/410 |
| 4,537,801 | 8/1985 | Takeda | 118/410 |
| 5,072,688 | 12/1991 | Chino et al. | 118/411 |
| 5,397,600 | 3/1995 | Shibata et al. | 118/410 |

OTHER PUBLICATIONS

English Abstract of Japanese Patent 2-207866, Method and Device for Coating, Aug. 17, 1990.
English Abstract of Japanese Patent 57-84771, Coater, May 27, 1982.

*Primary Examiner*—Brenda A. Lamb
*Attorney, Agent, or Firm*—Oblon, Spivak, McClelland, Maier & Neustadt, P.C.

[57] ABSTRACT

In a coating apparatus having an extrusion coating head, the working value H of a back end edge which corresponds to an end portion at the downstream side of a support feeding direction of a back edge of the extrusion coating head is set to 25 μm or less, and the straightness of said back end edge with respect to the coating width is set to 5 μm or less. Accordingly, a coating operation to form coated films at a stable thickness can be stably performed without occurrence of streaks and coating unevenness on the films, and a judgment on coating surface characteristics can be readily performed without actually carrying the coating operation.

10 Claims, 3 Drawing Sheets

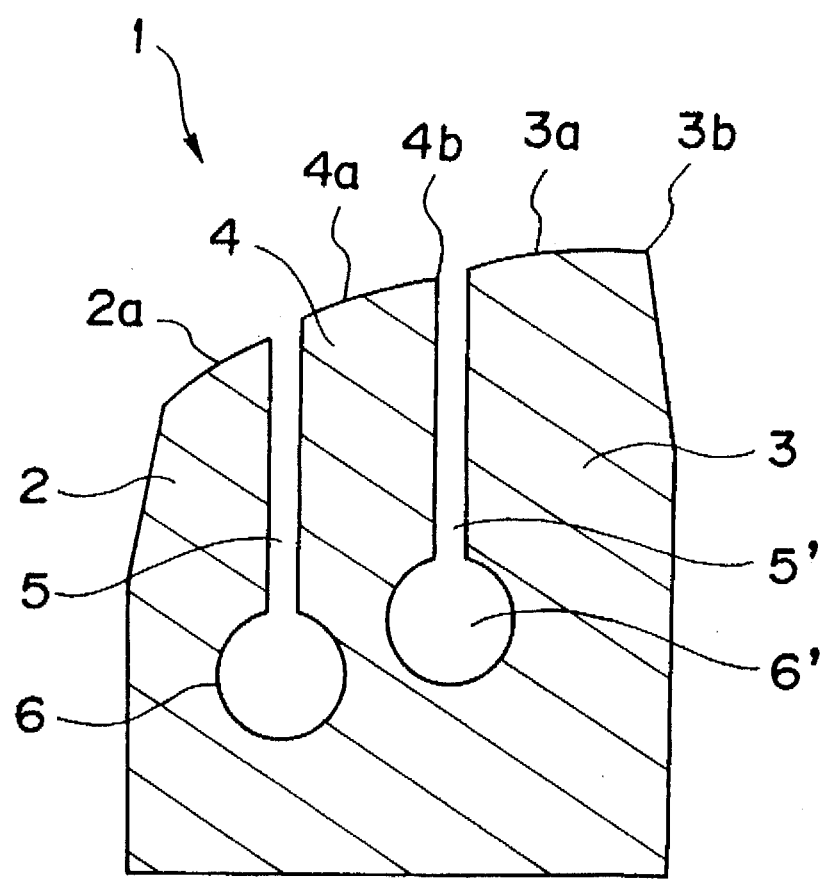

COATING APPARATUS

BACKGROUND OF THE INVENTION

1. Field of the Invention

This invention relates to a coating apparatus, and particularly to a coating apparatus which is capable of performing an uniform coating on a support.

2. Description of Related Art

Various kind of coating methods such as a roll coating method, a gravure coating method, a slide bead coating method and a doctor coating method have been conventionally used as a method of applying a coating liquid onto a support. However, an extrusion coating method has recently come to public attention as it provides a high productivity and a high operating performance, as well as an outstanding controllability of the thickness of a coated film on the support.

In the extrusion coating method, a coating operation is performed as follows. A front edge (at the upstream side of a support feeding direction) and a back edge (at the downstream side of the support feeding direction) of an extrusion coating head are pressed against a support in the middle of feeding means such as support rolls or the like so that a prescribed tension is applied to the support. In this case, the clearance between the back edge surface and the support is controlled to adjust the thickness of a coated film to a desired value while changing an extrusion amount of coating liquid which is extruded through a slit portion.

In the extrusion coating method as described above, the back edge of the extrusion coating head serves as a doctor edge, and thus the state of the end portion of the back edge at the downstream side of the support feeding direction (i.e., the back end edge) has an important effect on a coating surface characteristic. Therefore, the back end edge is required to be sharp. For example, there has been proposed a coating apparatus having a back end edge which is designed to be right-angled in section (as disclosed in Japanese Laid-open Patent Application No. 52-22039).

However, when a grinding work is conducted on the back end edge to sharpen the back end edge, the grinding work necessarily induces occurrence of burr in the back end edge, and this burr finally causes a problem that streaks occur on a coated film.

Furthermore, there has been proposed a coating apparatus in which a straightness of a front edge surface and/or a straightness of a back edge surface is set to 50 µm or less, preferably 5 µm or less (as disclosed in Japanese Laid-open Patent Application No. 2-207866). However, in the coating apparatus as disclosed in Japanese laid-open Patent Application No. 2-207866, a straightness of a back end edge which acts on a coat surface characteristic, a thickness of a coated film, etc. is not set.

When a burr removing work (burring work) is conducted on the back end edge to remove the burr as described above, it is difficult to control R-surface, C-surface or chamfering work in µm order which is accompanied by the burring work. Therefore, the straightness of the back end edge which acts on the coat surface characteristic, the thickness of the coated film, etc. is reduced, and the thickness of the coated film in a transverse direction greatly varies, so that it is difficult control the thickness of the coated film. Furthermore, even if the back end edge could be processed in µm order, the back end edge will be worn when coating liquid containing particles having relatively high hardness, such as magnetic coating liquid, is used. If such a worn portion of the back end edge is repetitively ground again to finish the back end edge, the precision of the finishing work trends to be gradually reduced as the frequency of the grinding work increases.

In addition, the importance of the back edge serving as the doctor edge has been known as described above, however, a working method and a numerical range for obtaining an excellent coating surface characteristic has been still unclear. Therefore, a judgment on practical use of a produced extrusion coating head can not be made unless the coating operation is actually carried out using tile extrusion coating head, and thus a coating apparatus which is capable of making the judgment on practical use more reasonably has been required.

SUMMARY OF THE INVENTION

An object of the present invention is to provide a coating apparatus for performing a long-term stable coating operation without occurrence of streaks and unevenness of coating on a coated film to thereby obtain a coated film of stable thickness, in which a judgment on the coating surface characteristic can be readily made without actually carrying out the coating operation.

In order to attain the above object, according to the present invention, a creating apparatus having an extrusion coating head for continuously extruding coating liquid from a slit to coat the coating liquid on the surface of a support, is characterized in that the working value H (as described later) of a back end edge which is the end portion of a back edge of the extrusion head at the downstream side of a support feeding direction is set to 25 µm or less, and the straightness of the back end edge is set to 5 µm or less with respect to the coating width.

It the coating apparatus of the present invention, the working value H of the back end edge and the straightness of the back end edge with respect to the coating width are set to prescribed ranges, whereby an extremely uniform coated film having little variation in its film thickness can be formed on a support without streaks and unevenness of coating on the coated film. The judgment on the practical use of the extrusion coating head can be readily performed by measuring the working value H and the straightness as described above.

BRIEF DESCRIPTION OF THE DRAWINGS

FIG. 5 is a cross-sectional view showing another embodiment of the extrusion coating head constituting the coating apparatus of the present invention.

DETAILED DESCRIPTION OF THE PREFERRED EMBODIMENTS

Preferred embodiments according to the present invention will be described hereunder with reference to the accompanying drawings.

Figure 1:
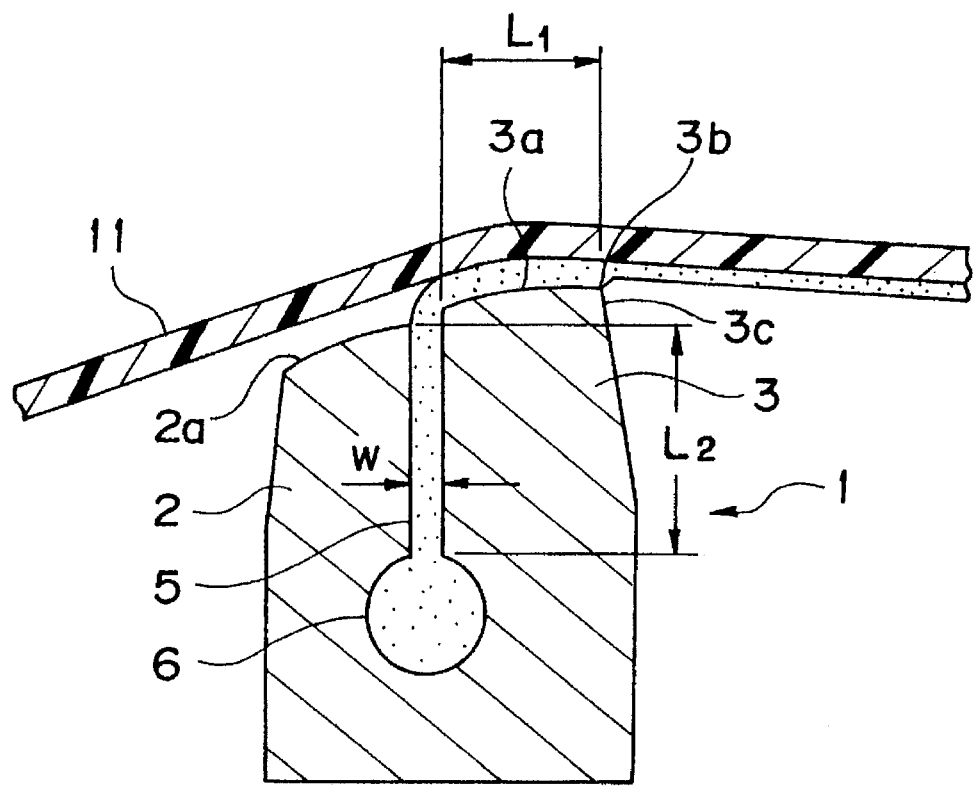
FIG. 1 is a cross-sectional view showing an embodiment of an extrusion coating head constituting a coating apparatus of the present invention.
Figure 2:
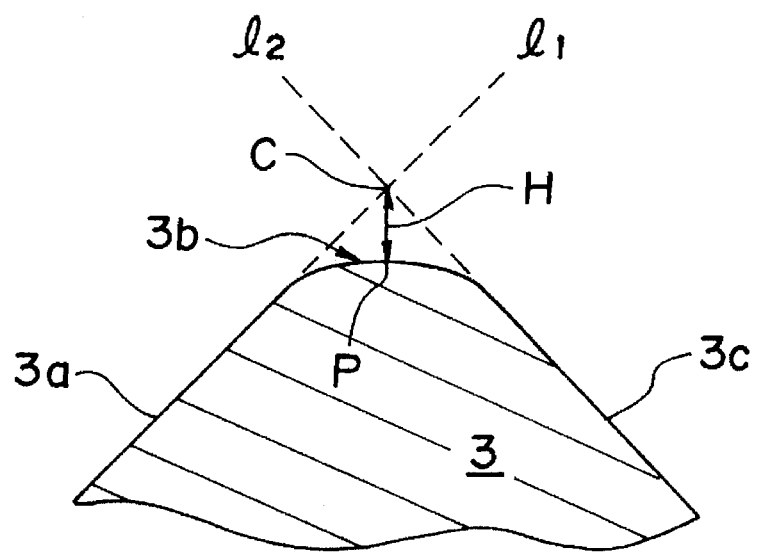
FIG. 2 is a partially enlarged cross-sectional view showing a back end edge of the extrusion coating head shown in FIG. 1.

FIG. 1 is a cross-sectional view showing an extrusion coating head of an embodiment of the present invention, and FIG. 2 is a partially enlarged cross-sectional view showing a back edge of the extrusion coating head shown in FIG. 1. In FIG. 1, the extrusion coating head 1 comprises a front edge 2, a back edge 3, a slit portion 5 which is formed between the front edge 2 and the back edge 3, and a pocket portion 6. Coating liquid which is stocked in the pocket portion 6 is continuously extruded through the slit portion 5 and coated on a support 11.

In the present invention, the working value H of a back end edge $3b$ corresponding to the end portion (at the downstream side of a support feeding direction) of a back edge surface $3a$ which is the upper end surface of the back edge 3 of the extrusion coating head 1 is set to 25 μm or less, preferably 15 μm or less, and the straightness of the back end edge $3b$ with respect to the coating width is set to 5 μm or less, preferably 3 μm or less.

Here, the working value H in section of the back edge 3 in the support feeding direction is defined as follows with respect to FIG. 2. In FIG. 2, $l_1$ represents an extension line of a side end line of the back edge surface $3a$, $l_2$ represents an extension line of a side end line of the side surface $3c$ of the back edge 3, and C represents an intersection point between the extension lines $l_1$ and $l_2$. In this case, the working value H is defined as the shortest distance of a line connecting the intersection point and the back end edge $3b$ (in FIG. 2, the distance from the intersection point C to the uppermost position P of the back end edge $3b$). The measurement of the working value H can be performed by using a contour measuring machine (Contour Record 1600B produced by Tokyo Precision Company) and obtaining a measurement value through comparison with a calibration master attached to the measuring machine. For the measurement of the working value H, the extrusion coating head is first inclined at 45° and fixed, and then a tracer driving portion is adjusted so as to be perpendicular to the transverse direction of the extrusion coating head. The measurement is made while the tracer gets over the back end edge (shifts in the direction from the back edge surface $3a$ to the side surface $3c$ or in the opposite direction thereto in FIG. 2). The measurement is made at five positions, and the average value of the measured values is used as the working value H.

The working value H is a parameter representing an abrasion loss when the burring work is conducted on the back end edge $3b$, and the back end edge $3b$ is expected to be sharper as the working value H is smaller. If the working value H exceeds 25 μm, the coating surface characteristic is reduced and thus streaks and coating unevenness are liable to occur on the coated film, so that the uniform coating operation is disturbed.

The straightness is represented with the numerical value of the maximum swell which is measured according to JIS B 0610 (1987). That is, a reference length is subtracted from a filter swell curve or roiling circle swell curve to obtain an extraction portion. The extraction portion is sandwiched between two straight lines which are parallel to an average line of the extraction portion, and the interval between the two straight lines is measured in a depth magnification direction of the filter swell curve or rolling circle swell curve. Representing the measured value of the interval in terms of micrometer unit (μm), it corresponds to the "straightness".

The measurement method as described above will be described in more detail with reference to FIGS. 3 and 4.

Figure 3:
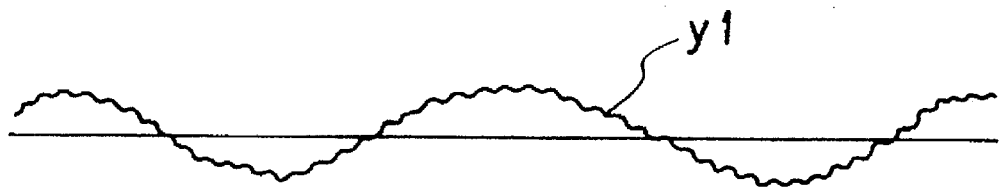
FIG. 3 is a diagram to explain straightness.
Figure 4:
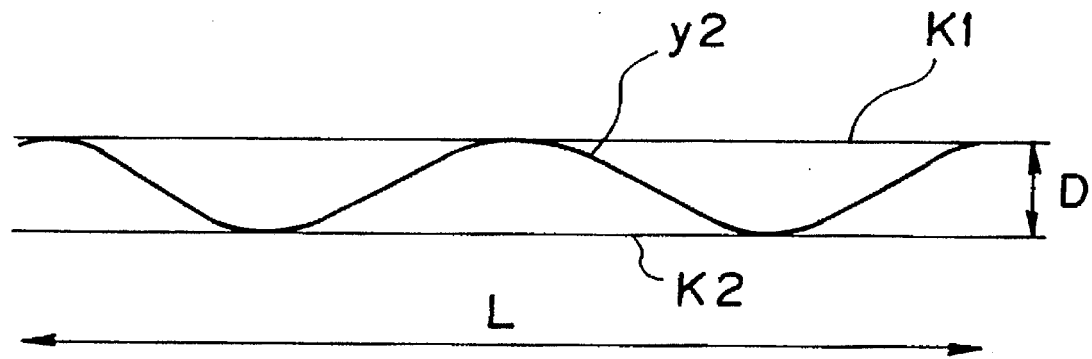
FIG. 4 is another diagram to explain the straightness.

FIG. 3 schematically shows a cross section curve of the back end edge $3b$ in the coating with direction. The cross section curve can be obtained by the tracer method.

The cross section curve y1 as shown in FIG. 3 comprises a swell component (low frequency component) and a finer roughness component (high frequency component). If only the swell component (low frequency component) is extracted from the cross section curve y1 and the roughness component (high frequency component) is cut off from the cross section curve y1, a swell curve y2 as shown in FIG. 4 can be obtained. The numerical value of the maximum swell (straightness) is obtained as follows. The swell curve y2 per reference length L is obtained as shown in FIG. 4, and two ideally straight lines K1 and K2 are drawn so as to come into contact with the peaks of the swell curve y2 (i.e., two tangential straight lines to the swell curve y2 are obtained). The numerical value of the maximum swell (straightness) is obtained on the basis of the interval D between the lines K1 and K2.

In the present invention, the measurement of the straightness is measured by using a straightness measuring machine (PC-Nanoway produced by Kyoccera Company) and obtaining a measurement value through comparison with a ceramic calibration master attached to the machine. The measurement is made at three times over the overall length of the back end edge in the coating width (transverse) direction at an interval of 2 mm, and the average value of the measured values is used as the "straightness".

If the straightness exceeds 5 μm, the thickness of the coated film varies greatly, and thus no uniform coating operation can be performed.

A lapping tape, polishing liquid, a bamboo spatula or the like may be used to perform the burring work on the back end edge $3b$ so that the working value H and the straightness are set to the ranges as described above. With respect to the burring work, it is effective to perform the burring work while checking the worked surface with a microscope. As the lapping tape used is preferably used ones whose number is from about 6000th to 8000th, and as the polishing liquid is preferably used ones containing diamond paste or the like whose number is from 8000th to 10000th.

The length $L_1$ of the back edge 3 of the extrusion coating head 1 (the length in the support feeding direction) can be suitably set in accordance with its use purpose, the viscosity coating liquid which is an object to be used, the thickness of a coated film, etc. For example, it may be set to 0.5 to 5 mm, preferably 0.8 to 3 mm. The length of the back edge 3 is determined as follows. The coating liquid flow direction at the slit portion 5 is set as a reference line, and two lines which are parallel to the reference line are drawn at the end point of the back edge 3 at the slit portion side and at the back end edge $3b$ of the back edge 3. The distance of these parallel lines is set as the length of the back edge.

No special restriction is imposed on the shape of the back edge surface $3a$. That is, any shape such as a curved shape, a polyhedral shape or the like may be used insofar as no foreigner is trapped at the outlet port of the slit portion and streak or no coating unevenness occurs on a coated film.

The slit portion 5 is a passage which is formed along the transverse direction of the extrusion coating head 1 (in a direction perpendicular to the support feeding direction) so as to have an aperture width w of about 0.05 to 0.6 mm. The passage Length $L_2$ of the slit portion 5 may be set in accordance with the composition and physical property of the coating liquid, a supply amount of the coating liquid, etc. Further, the width of the outlet port of the slit portion 5 which is formed between the front edge surface $2a$ and the back edge surface $3a$ is generally set to be equal to the aperture width w thereof, however, it may be different from the aperture width w.

The extrusion coating head 1 thus constructed can be produced using the same material as the conventional extrusion coating head, such as stainless steel, cemented carbide or the like.

In the extrusion coating head 1, the coating liquid is supplied from a coating liquid supply means (not shown) into the pocket portion 6. The supply of the coating liquid into the pocket portion 6 may be performed through one end portion of the pocket portion 6, through both end portions of the pocket portion 6 or through the middle portion of the pocket portion 6. The coating liquid which is supplied into the pocket portion 6 is extruded through the slit portion 5 from the outlet port of the slit portion 5, and continously supplied into a gap portion between the back edge face 3a and the support 11 being fed. The interval between the support 11 and the back edge face 3a is set in accordance with the supply amount of the coating liquid, the tension of the support 11 to the extrusion coating head 1, a lap angle, etc., and the coating liquid is coated on the support 11. At this time, the back end edge 3b serves as a doctor edge, and the working value H and the straightness of the back end edge 3b are set to the ranges as described above, so that an excellent doctoring effect can be obtained. Therefore, an uniform coating film having little variation of its thickness can be formed on the support 11 without occurrence of streaks and coating unevenness on the coated film.

Furthermore, in the coating apparatus of the present invention, in place of the extrusion coating head for one layer as described above, a multi-layer (double-layer in FIG. 5) simultaneous coating extrusion coating head as shown in FIG. 5 may be used. The extrusion coating head 1 shown in FIG. 5 includes a center edge 4 between the front edge 2 and back edge 3, and two slit portions 5 and 5' and two pocket portions 6 and 6'. The multi-layer coating extrusion coating head 1 as described above adopts the same working value H and the same straightness as the back end edge 3b of the one-layer coating extrusion coating head. That is, in this case, the working value H is also set to 25 μm or less, preferably 15 μm or less, and the straightness of the back end edge 3b with respect to the coating width is also set to 5 μm or less, preferably 3 μm or less.

No special restriction is imposed on the support which is usable for the coating apparatus of the present invention. For example, a plastic film such as a polyethylene terephthalate film or the like, or a longitudinal flexible support such as paper, metal foil or the like may be used as the support. Furthermore, various kinds of treated layers may be beforehand formed on the support.

No special restriction is imposed on the coating liquid usable for the coating apparatus of the present invention insofar as it is applicable to the coating operation using the extrusion coating head. The extrusion coating method is excellent in controllability of the thickness of a coated film, and thus it may be applied to fields in which a stable coating film thickness has been hitherto required. As one of the fields, it may be applied to form a magnetic recording layer or back coat layer for magnetic recording medium. Furthermore, magnetic coating liquid containing magnetic powder, binder and solvent or coating liquid for batch coat may be used as one kind of coating liquid usable for the present invention.

With respect to the magnetic coating liquid, as the magnetic powder may be used oxide fine powder such as γ-Fe$_2$O$_3$, Co-contained γ-Fe$_2$O$_3$, Fe$_3$O$_4$, Co-contained Fe$_3$O$_4$, CrO$_2$, barium ferrite, strontium ferrite or the like, metal such as Fe, Co, Ni or the like or alloy fine powder thereof, iron carbide or the like. As the binder may be used any well-known resin binder. Furthermore, no restrict on is imposed on the solvent, and for example, ketone groups such as cyclohexanone, methyl ethyl ketone, methyl isobutyl ketone, etc., aromatic groups such as toluene, or the like may be suitably selected. Furthermore, various kinds of additives such as inorganic fine particles, lubricant or the like may be added to the magnetic coating liquid if occasion demands. A magnetic recording layer which is formed of the magnetic coating liquid as described above is preferably about 0.1 to 6 μm in dry thickness, and the magnetic recording layer preferably contains magnetic powder of 30 to 92 wt %. As recently utilized, the coating liquid may be multi-layered in a wet state to form a coating layer. In this case, the coating liquid is not limited to magnetic liquid, and any material such as non-magnetic liquid, solution of resin or the like may be used insofar as it is suitable for the coating by the extrusion coating head as described above, and a suitable layer structure may be selected for the coating layer if occasion demands.

With respect to the coating liquid for back coat, as pigment may be used non-magnetic inorganic powder such as carbon black, α-Fe$_2$O$_3$, TiO$_2$, CaO, SiO$_2$, Cr$_2$O$_3$, α-Al$_2$O$_3$, SiC, CaCO$_3$, BaSO$_4$, ZnO, MgO, boron nitride, TiC or the like. As the binder may be used any well-known resin binder. Further, no restriction is imposed on the solvent, and for example, ketone groups such as cyclohexanone, methyl ethyl ketone, methyl isobutyl ketone, etc., aromatic groups such as toluene, or the like may be suitably selected. Furthermore, various kinds of additives such as inorganic fine particles, lubricant or the like may be added to the coating liquid for back coat if occasion demands. A back coat layer which is formed of the coating liquid for back coat as described above is preferably about 0.1 to 1.0 μm, and the back coat layer preferably contains pigment of 30 to 80 wt %.

Next, the present invention will be described in more detail using the embodiments of the present invention and the comparative examples.

A polyethylene terephthalate film of 1000 mm width and 15 μm thickness. The magnetic coating liquid having the following compositions was prepared.

| (composition of magnetic coating liquid) | |
|---|---|
| Co-contained γ-Fe$_2$O$_3$ (Hc = 750 Oe, specific surface area (BET) = 43 m$^2$/g) | 100 parts by weight |
| vinyl chloride-vinyl acetate-vinyl alcohol copolymer (polymerization degree = 310, composition ratio = 88:6:6) | 10 parts by weight |
| polyester polyurethane resin | 10 parts by weight |
| carbon black | 5 parts by weight |
| alumina powder | 5 parts by weight |
| stearic acid | 2 parts by weight |
| butyl stearic acid | 1 part by weight |
| methyl ethyl ketone | 100 parts by weight |
| toluene | 100 parts by weight |
| cyclohexanone | 80 parts by weight |
| polyisocyanate | 4 parts by weight |

EMBODIMENTS 1 to 15, COMPARATIVE EXAMPLES 1 TO 9

The burring work as described below was conducted on the back end edge of the one-layer coating type extrusion coating head shown in FIG. 1 to produce an extrusion coating head having the working value H and the straightness as shown in the table 1. The working value H and the straightness were measured as described below.
(Burring work)

The extrusion coating head was inclined at 45° and fixed, and the back end edge thereof was rubbed by a lapping tape (No. 6000th to No. 8000th) while watching a monitor screen (magnifying power of 200) through a microscope. The burring work providing the working value H above 25 μm or the straightness above 5 μm was performed by intentionally increasing the rubbing frequency of the lapping tape. Further, with respect to the straightness, as well exceeding 5 μm was formed locally on the back end edge.
(Measurement method of working value H)

the extrusion coating head was inclined at 45° and fixed, and then the tracer driving portion of the contour measuring machine (contour record 1600B produced by Tokyo Precision Company) was adjusted to be perpendicular to the transverse direction of the extrusion coating head. The distance H shown in FIG. 2 was measured while the tracer driving portion got over the back end edge. The measurement was made at five positions, and the average value of measurement values which were obtained through comparison with the calibration master attached to the measuring machine was set as the working value H.
(Measurement method of straightness)

The measurement of the straightness was measured using a straightness measuring machine (PC-Nanoway produced by Kyoccera Company) over the overall length in the transverse direction of the back end edge at an interval of 2 mm at three times, and the average value of values which were obtained through comparison with a ceramic calibration master attached to the machine was set as the "straightness".

Thereafter, by using the produced extrusion coating head, the magnetic coating liquid as described above was coated on a support under the following coating condition, and then dried to form a magnetic recording layer (thickness of 2.8 μm).

| feeding speed of supporter | 300 m/minute |
| coating width | 500 mm, 1000 mm |

The coating surface characteristic (coating surface state, variation of thickness of coasted film) of the magnetic recording layer of the magnetic recording medium thus formed was estimated according to the following estimation standards, and the result is shown in the following table 1.
(Estimation standards of the coating surface state)

"very" . . . Very good (no coating streak and no coating unevenness were observed)

"good" . . . Good (coating streaks of two or less were observed and the coating unevenness was unremarkable)

"bad" . . . Bad (coating streaks of three or more were observed and the coating unevenness was remarkable)
(Variation of thickness of coated film)

"very" . . . Very good (less than 0.2 μm)

"good" . . . Good (above 0.2 μm and less than 0.4 μm)

"bad" . . . Bad (above 0.4 μm)

TABLE 1

|        | W.V.H. (μm) | S (μm) | C.S.S. | V.T.C.F. |
|--------|-------------|--------|--------|----------|
| Emb. 1 | 4.5 | 1.0 | very | very |
| Emb. 2 | 4.5 | 2.8 | very | very |
| Emb. 3 | 0.5 | 2.8 | very | very |
| Emb. 4 | 4.5 | 3.5 | very | good |
| Emb. 5 | 4.5 | 4.5 | very | good |
| C.E. 1 | 4.5 | 6.0 | very | bad |
| C.E. 2 | 4.5 | 9.0 | very | bad |
| Emb. 6 | 6.0 | 2.8 | very | very |
| Emb. 7 | 10.0 | 2.8 | very | very |
| Emb. 8 | 14.0 | 2.8 | very | very |
| Emb. 9 | 10.0 | 3.5 | very | good |
| Emb. 10 | 10.0 | 4.5 | very | good |
| C.E. 3 | 10.0 | 6.0 | very | bad |
| Emb. 11 | 16.0 | 2.8 | good | very |
| Emb. 12 | 20.0 | 2.8 | good | very |
| Emb. 13 | 24.0 | 2.8 | good | very |
| Emb. 14 | 20.0 | 3.5 | good | good |
| Emb. 15 | 20.0 | 4.5 | good | good |
| C.E. 4 | 20.0 | 6.0 | good | bad |
| C.E. 5 | 27.0 | 2.8 | bad | very |
| C.E. 6 | 35.0 | 2.8 | bad | very |
| C.E. 7 | 27.0 | 3.5 | bad | good |
| C.E. 8 | 27.0 | 4.5 | bad | good |
| C.E. 9 | 27.0 | 6.0 | bad | bad |

(*)W.V.H.: working value H, S: straightness, C.S.S.: coating surface state, V.T.C.F.: variation of thickness of coated film
Emb.: Embodiment, C.E.: Comparative Example As is apparent from the table 1, if the working value H of the back end edge of the extrusion coating head exceeds 25 μm, coating streak and coating unevenness frequently appears, and thus the coating surface state is deteriorated. Furthermore, with respect to the straightness, it has been recognized that if a swell exceeding 5 μm exists locally (in a local area) on the back end edge, the variation of the thickness of the coated film trend not to be attenuated in the area.

The same phenomenon as described above was commonly observed for the coating width of 500 mm and 1000 mm. Accordingly, if the working value H of the back end edge is set to 25 μm or less and the straightness is set to 5 μm or less over the overall width of the coating, an extremely uniform coated film having little variation of the thickness of the coated film can be formed on a support with no streak and no coating unevenness. Furthermore, it was proved that the practical use of the extrusion coating head could be judged without actually carrying out a coating operation by measuring the working value H and the straightness of the extrusion coating head.

The present invention is not limited to the above embodiments, and various modifications may be made without departing from the subject matter if the present invention. Therefore, the present examples and embodiments are to be considered as illustrative and not restrictive, and the invention is not to be limited to the details given herein, but may be modified within the scope of the appended claims. Further, any modification and alteration which are equivalent to the scope of the appended claims are within the scope of the appended claims.

What is claimed is:

1. A coating apparatus comprising:
    an extrusion coating head having a front edge and a back edge separated by slit, extrusion coating head continuously extruding a coating liquid from said slit to coat the surface of
    wherein a back end edge of said back edge representing the farthest downstream end portion of said back edge with respect to a support feeding direction has a working value of 25 μm or less and a straightness of 5 μm or less.

2. The coating apparatus as claimed in claim 1, wherein the working value H is set to 15 μm or less.

3. The coating apparatus as claimed in claim 1, wherein the straightness is set to 3 μm or less.

4. The coating apparatus as claimed in claim 1, wherein the length of said back edge is set to 0.5 to 5 mm.

5. The coating apparatus as claimed in claim 1, wherein the aperture width of said slit is set to 0.05 to 0.6 mm.

6. A coating apparatus comprising:

an extrusion coating head having a front edge, a back edge, and at least one center edge separated by at least two slits, said extrusion coating head continuously extruding a coating liquid from said slits to coat the surface of a support, wherein a back end edge of said back edge representing the farthest downstream end portion of said back edge with respect to a support feeding direction has a working value of 25 μm or less and a straightness of 5 μm or less.

7. The coating apparatus as claimed in claim 6, wherein the working value H is set to 15 μm or less.

8. The coating apparatus as claimed in claim 6, wherein the straightness is set to 3 μm or less.

9. The coating apparatus as claimed in claim 6, wherein the length of said back edge is set to 0.5 to 5 mm.

10. The coating apparatus as claimed in claim 6, wherein each of said silts has an aperture width of 0.05 to 0.6 mm.

* * * * *